US012647250B2

(12) United States Patent
Kawai

(10) Patent No.: US 12,647,250 B2
(45) Date of Patent: Jun. 2, 2026

(54) CIPHERTEXT CONVERSION SYSTEM, CIPHERTEXT CONVERSION METHOD, AND NON-TRANSITORY COMPUTER READABLE MEDIUM

(71) Applicant: Mitsubishi Electric Corporation, Tokyo (JP)

(72) Inventor: Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/815,164

(22) Filed: Aug. 26, 2024

(65) Prior Publication Data

US 2024/0421976 A1     Dec. 19, 2024

Related U.S. Application Data

(63) Continuation of application No. PCT/JP2022/017725, filed on Apr. 13, 2022.

(51) Int. Cl.
H04L 9/06     (2006.01)
H04L 9/08     (2006.01)

(52) U.S. Cl.
CPC .......... H04L 9/0618 (2013.01); H04L 9/0869 (2013.01); H04L 9/0894 (2013.01)

(58) Field of Classification Search
CPC .... H04L 9/0618; H04L 9/0869; H04L 9/0894
See application file for complete search history.

(56) References Cited

U.S. PATENT DOCUMENTS 9,258,595 B2 * 2/2016 Durand .................. H04N 7/163
2022/0029795 A1 1/2022 Kawai et al.
(Continued)

FOREIGN PATENT DOCUMENTS

WO     WO 2014/083784 A1     6/2014
WO     WO 2020/240630 A1     12/2020
WO     WO 2022/244079 A1     11/2022

OTHER PUBLICATIONS

Syalim et al., "Improved Proxy Re-encryption Scheme for Symmetric Key Cryptography", in Cryptology ePrint Archive: Report 2021/276, 2017, pp. 1-15.
(Continued)

*Primary Examiner* — Nicholas P Celani
(74) *Attorney, Agent, or Firm* — Birch, Stewart, Kolasch & Birch, LLP

(57)     ABSTRACT

A ciphertext conversion system includes a conversion device (600) including a conversion unit (604). The conversion unit (604) performs encryption of a public-key encryption scheme using a public key and a decryption enabling condition, so as to generate a transformed public-key ciphertext and a key corresponding to the transformed public-key ciphertext, and calculates, as at least part of a transformed symmetric-key ciphertext, an exclusive-OR of a first ciphertext, a value calculated by performing encryption of a symmetric-key encryption scheme using a sub secret key and second auxiliary information, and a value calculated by performing encryption of the symmetric-key encryption scheme using the key corresponding to the transformed public-key ciphertext and third auxiliary information, where the first ciphertext is an exclusive-OR of a value calculated by performing encryption of the symmetric-key encryption scheme using first auxiliary information and a main secret key, a value calculated by performing encryption of the symmetric-key encryption scheme using the second auxiliary information and the sub secret key, and a plaintext.

8 Claims, 15 Drawing Sheets

(56) References Cited

U.S. PATENT DOCUMENTS

| | | | | |
|---|---|---|---|---|
| 2022/0407729 | A1 * | 12/2022 | Zhang | ................. H04L 63/0435 |
| 2024/0048377 | A1 * | 2/2024 | Kawai | ................... H04L 9/0637 |
| 2024/0421975 | A1 * | 12/2024 | Kawai | ....................... H04L 9/16 |
| 2025/0080322 | A1 * | 3/2025 | Kambayashi | ......... H04L 9/3213 |

OTHER PUBLICATIONS

Syalim et al., "Realizing Proxy Re-encryption in the Symmetric World", Communications in Computer and Information Science, Nov. 2011, vol. 251, pp. 1-20.
The International Search Report (PCT/ISA/210) issued in PCT/JP2022/017725, mailed on Jun. 28, 2022.
Yu et al.,"Achieving Flexibility for ABE with Outsourcing via Proxy Re-Encryption", Section 16: Applied Crypto 2, ASIACCS'18, Jun. 2018, pp. 659-672.
English translation of the International Search Report for International Application No. PCT/JP2022/017726, dated Jun. 28, 2022.

* cited by examiner

100: CIPHERTEXT CONVERSION SYSTEM

300: COMMON PARAMETER GENERATION DEVICE

500: CIPHERTEXT GENERATION DEVICE

600: CONVERSION DEVICE

700: DECRYPTION DEVICE

400: USER SECRET KEY GENERATION DEVICE

200: SYMMETRIC SECRET KEY GENERATION DEVICE

NETWORK

101: INTERNET

START

RECEIVE KEY BIT LENGTH k     S201

GENERATE RANDOM NUMBERS OF k BITS, AND SET THEM AS MAIN SECRET KEY sk1 AND SUB SECRET KEY sk2     S202

DISTRIBUTE MAIN SECRET KEY sk1 AND SUB SECRET KEY sk2     S203

END

START

RECEIVE KEY BIT LENGTH k — S301

GENERATE PUBLIC KEY pk AND MASTER SECRET KEY msk — S302

DISTRIBUTE PUBLIC KEY pk AND MASTER SECRET KEY msk — S303

END

START

S501
RECEIVE MAIN SECRET KEY sk1 AND SUB SECRET KEY sk2

S502
RECEIVE PLAINTEXT M

S503
GENERATE AUXILIARY INFORMATION auxC1 AND
AUXILIARY INFORMATION auxC2, AND
C = SENC(sk1, auxC1) + SENC(sk2, auxC2) + M
USING SYMMETRIC-KEY ENCRYPTION SENC S504
TRANSMIT Csk = (C, auxC1, auxC2) TO EACH DEVICE

END

Fig. 13

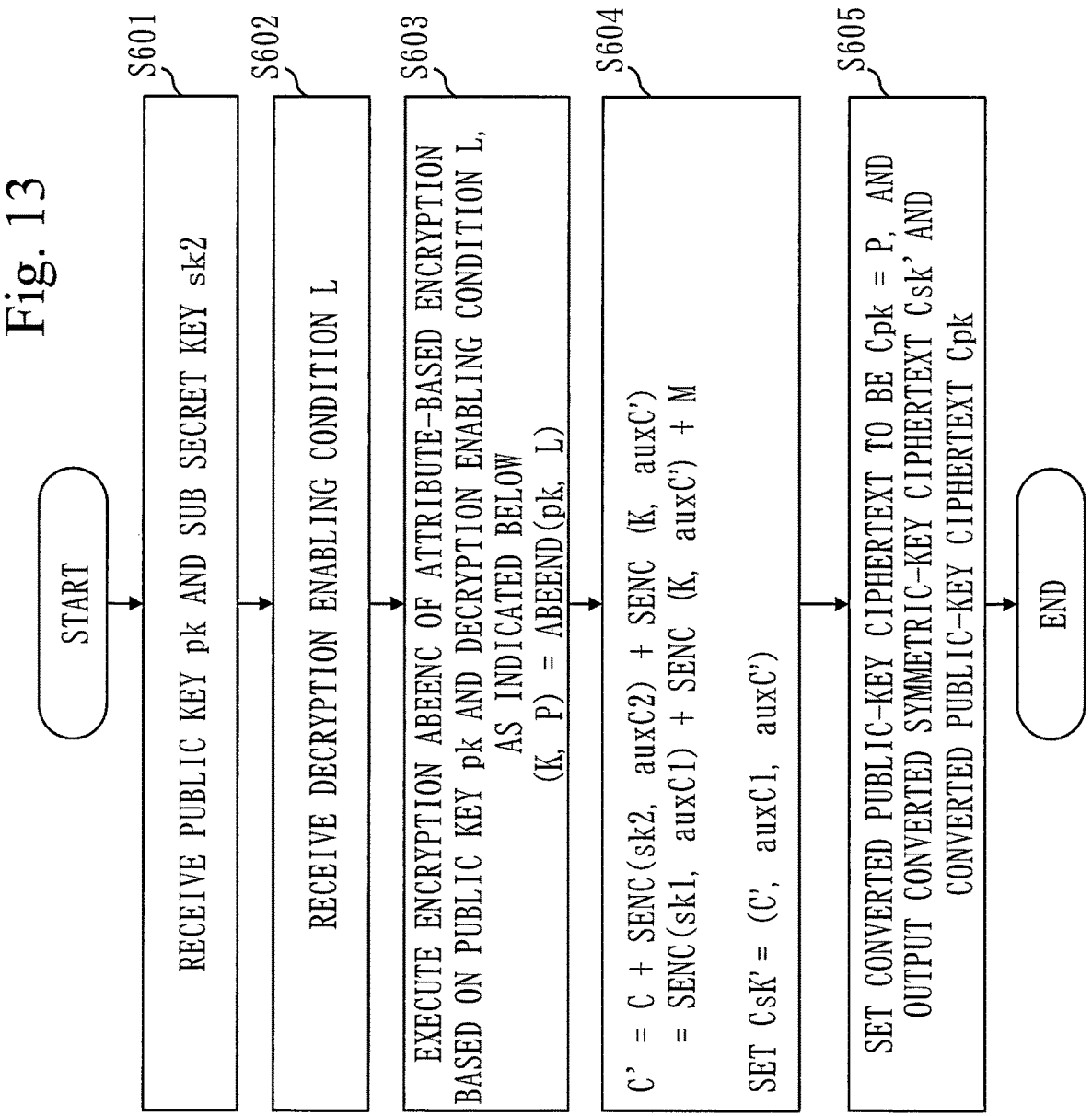

START

S601
RECEIVE PUBLIC KEY pk AND SUB SECRET KEY sk2

S602
RECEIVE DECRYPTION ENABLING CONDITION L

S603
EXECUTE ENCRYPTION ABEENC OF ATTRIBUTE-BASED ENCRYPTION BASED ON PUBLIC KEY pk AND DECRYPTION ENABLING CONDITION L, AS INDICATED BELOW
(K, P) = ABEEND(pk, L)

S604
C' = C + SENC(sk2, auxC2) + SENC (K, auxC')
  = SENC(sk1, auxC1) + SENC (K, auxC') + M SET CsK' = (C', auxC1, auxC')

S605
SET CONVERTED PUBLIC-KEY CIPHERTEXT TO BE Cpk = P, AND OUTPUT CONVERTED SYMMETRIC-KEY CIPHERTEXT Csk' AND CONVERTED PUBLIC-KEY CIPHERTEXT Cpk

END

START

S701

RECEIVE CONVERTED PUBLIC-KEY CIPHERTEXT Cpk (= P) AND CONVERTED SYMMETRIC-KEY CIPHERTEXT Csk'

S702

RECEIVE USER SECRET KEY sku = (skᵣ, sk1)

S703

K = ABEDEC(skᵣ, P)

M = C' + SENC(K, auxC') + SENC(sk1, auxC1)

S704

OUTPUT PLAINTEXT M

END

CIPHERTEXT CONVERSION SYSTEM, CIPHERTEXT CONVERSION METHOD, AND NON-TRANSITORY COMPUTER READABLE MEDIUM

CROSS REFERENCE TO RELATED APPLICATION

This application is a Continuation of PCT International Application No. PCT/JP2022/017725, filed on Apr. 13, 2022, which is hereby expressly incorporated by reference into the present application.

TECHNICAL FIELD

The present disclosure relates to a ciphertext conversion system, a ciphertext conversion method, and a ciphertext conversion program.

BACKGROUND ART

A proxy re-encryption (PRE) system is a system that delegates an authority to decrypt a ciphertext to another person without decrypting the ciphertext. Non-Patent Literature 1 discloses a PRE scheme in any attribute-based encryption scheme (attribute-based PRE, ABPRE). By using the technique disclosed in Non-Patent Literature 1, proxy encryption can be realized between attribute-based encryption schemes that are mutually different. Non-Patent Literature 2 discloses a technique that changes a key without decrypting a ciphertext of symmetric-key encryption.

CITATION LIST

Non-Patent Literature

Non-Patent Literature 1: Z. Yu, M. H. Au, R. Yang, J. Lai, Q. Xu, "Achieving Flexibility for ABE with Outsourcing via Proxy Re-Encryption", ASIACCS' 18, June
Non-Patent Literature 2: A. Syalim, T. Nishide, and K. Sakurai, "Realizing Proxy Re-encryption in the Symmetric World", Communications in Computer and Information Science 251, November 2011

SUMMARY OF INVENTION

Technical Problem

A typical proxy re-encryption scheme such as the scheme disclosed in Non-Patent Literature 1 is a technique that converts a ciphertext of a certain public-key encryption scheme to a ciphertext of another public-key encryption scheme. The technique disclosed in Non-Patent Literature 2 is a technique that converts a ciphertext of a symmetric-key encryption scheme to a ciphertext of the symmetric-key encryption scheme. That is, to convert a ciphertext of a symmetric-key encryption scheme to a ciphertext of a public-key encryption scheme using the existing techniques, it is necessary to decrypt the ciphertext of the symmetric-key encryption scheme once and then encrypt a decrypted plaintext by the public-key encryption scheme. Therefore, a problem of the existing techniques is that a plaintext is exposed when the ciphertext of the symmetric-key encryption scheme is converted to the ciphertext of the public-key encryption scheme, so that security is low.

An object of the present disclosure is to convert, without decryption, a ciphertext encrypted by a symmetric-key encryption scheme to a ciphertext of a public-key encryption scheme.

Solution to Problem

A ciphertext conversion system according to the present disclosure includes a conversion device including a conversion unit to perform encryption of a public-key encryption scheme using a public key and a decryption enabling condition, so as to generate a converted public-key ciphertext and a key corresponding to the converted public-key ciphertext, and calculate, as at least part of a converted symmetric-key ciphertext, an exclusive-OR of a first ciphertext, a value calculated by performing encryption of a symmetric-key encryption scheme using a sub secret key, which is a random number, and second auxiliary information, and a value calculated by performing encryption of the symmetric-key encryption scheme using the key corresponding to the converted public-key ciphertext and third auxiliary information, the first ciphertext being an exclusive-OR of a value calculated by performing encryption of the symmetric-key encryption scheme using first auxiliary information and a main secret key, which is a random number, a value calculated by performing encryption of the symmetric-key encryption scheme using the second auxiliary information and the sub secret key, and a plaintext.

Advantageous Effects of Invention

According to the present disclosure, a first ciphertext, which is a ciphertext encrypted by a symmetric-key encryption scheme, is converted using a value calculated by performing encryption of the symmetric-key encryption scheme using a sub secret key and second auxiliary information and a value calculated by performing encryption of the symmetric-key encryption scheme using a key corresponding to a converted public-key ciphertext and third auxiliary information. The key corresponding to the converted public-key ciphertext is a key generated by performing encryption of a public-key encryption scheme. Therefore, according to the present disclosure, a ciphertext encrypted by the symmetric-key encryption scheme can be converted, without being decrypted, to a ciphertext of the public-key encryption scheme.

BRIEF DESCRIPTION OF DRAWINGS

FIG. 13 is a flowchart illustrating operation of the conversion device 600 according to Embodiment 1;

DESCRIPTION OF EMBODIMENTS

In the description and drawings of embodiments, the same elements and corresponding elements are denoted by the same reference sign. The description of elements denoted by the same reference sign will be suitably omitted or simplified. Arrows in figures mainly indicate flows of data or signals or flows of processing. "Device or "unit" may be suitably interpreted as "device", "circuit", "equipment", "step", "procedure", "process", or "circuitry".

Embodiment 1

Description of Configuration

In this embodiment, a ciphertext conversion system 100 will be disclosed. An overview of this embodiment will be described below with reference to the drawings.

Figure 1:
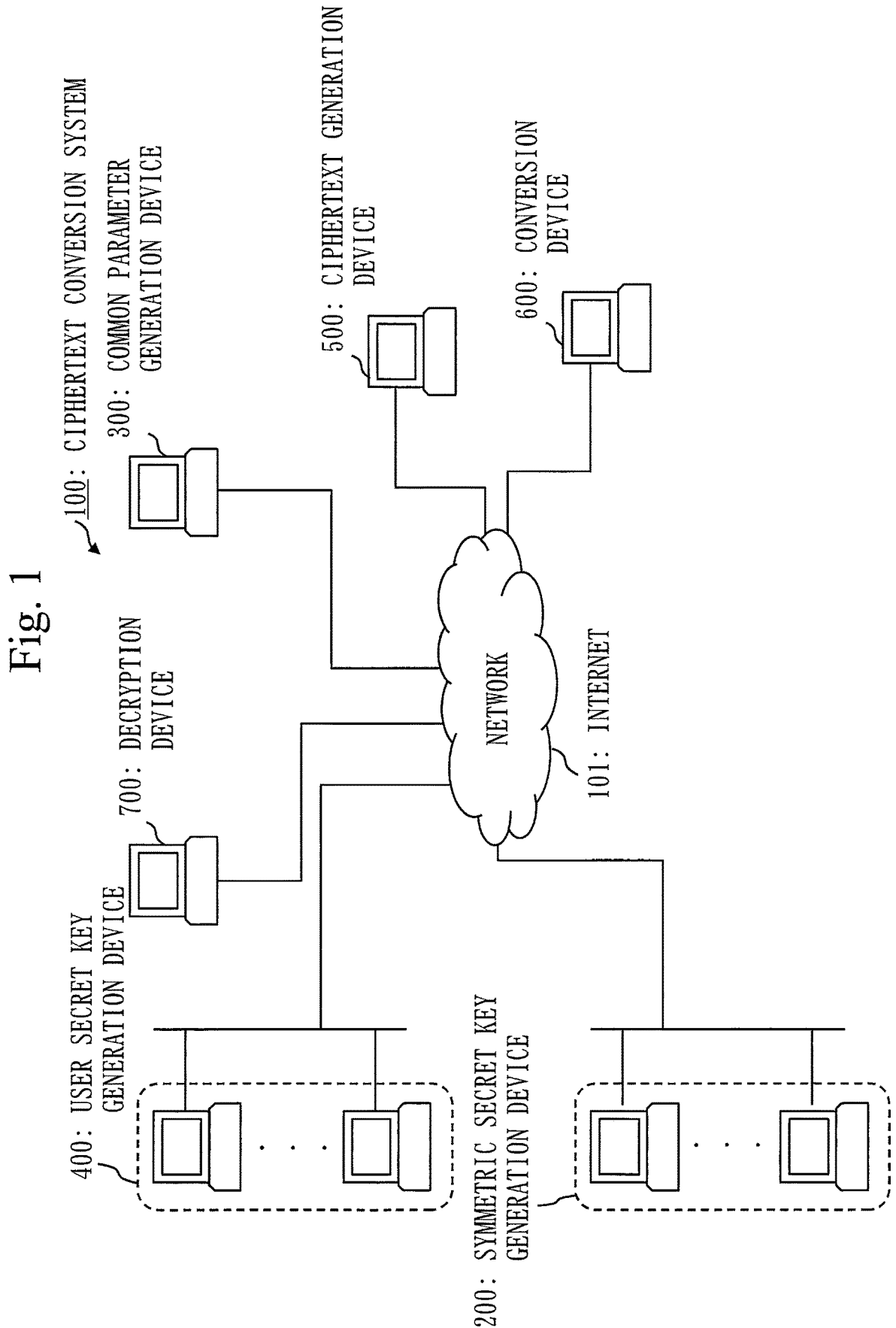
FIG. 1 is a figure illustrating an example of a configuration of a ciphertext conversion system 100 according to Embodiment 1.

FIG. 1 is a block diagram illustrating a configuration of the ciphertext conversion system 100 according to this embodiment. As illustrated in FIG. 1, the ciphertext conversion system 100 includes a plurality of symmetric secret key generation devices 200, a common parameter generation device 300, a plurality of user secret key generation devices 400, a ciphertext generation device 500, a conversion device 600, and a decryption device 700.

The devices constituting the ciphertext conversion system 100 may be installed in a local area network (LAN) or the like installed in the same company, instead of being connected with one another through Internet 101 so as to allow communication. At least two of the devices constituting the ciphertext conversion system 100 may be integrally configured as appropriate.

The Internet 101 is a communication channel that connects the plurality of symmetric secret key generation devices 200, the common parameter generation device 300, the plurality of user secret key generation devices 400, the ciphertext generation device 500, the conversion device 600, and the decryption device 700 so as to allow communication. The Internet 101 is a specific example of a network. In place of the Internet 101, other types of networks may be used.

The symmetric secret key generation device 200 is, as a specific example, a personal computer (PC), and is also called a symmetric-key encryption secret key generation device. The symmetric secret key generation device 200 is a computer that generates a main secret key sk1 and a sub secret key sk2, transmits the generated main secret key sk1 to the user secret key generation device 400, and transmits the generated sub secret key sk2 to the conversion device 600 via the Internet 101. The main secret key sk1 is also called a symmetric-key encryption main secret key. The sub secret key sk2 is also called a symmetric-key encryption sub secret key.

The common parameter generation device 300 is, as a specific example, a PC, and is a computer that generates common parameters to be used in the ciphertext conversion system 100, and transmits information indicating the generated common parameters to the plurality of user secret key generation devices 400 and the conversion device 600 as appropriate via the Internet 101. The common parameters include a master secret key msk and a public key pk. The information indicating the common parameters may be sent directly to each device by postal mail or the like, instead of being transmitted via the Internet 101. The term data and the term information may have substantially the same meaning.

The user secret key generation device 400 is, as a specific example, a PC. The user secret key generation device 400 receives the main secret key sk1 from the symmetric secret key generation device 200, receives the master secret key msk from the common parameter generation device 300, and accepts, as input, information indicating an attribute parameter $\Gamma$. The user secret key generation device 400 is a computer that generates a user secret key sku based on the received master secret key msk and main secret key sk1 and the attribute parameter $\Gamma$, and transmits the generated user secret key sku to the decryption device 700.

The ciphertext generation device 500 is a device that functions as a data encryption device, is a PC as a specific example, and is also called a symmetric-key ciphertext generation device. The ciphertext generation device 500 receives the main secret key sk1 and the sub secret key sk2 from the symmetric secret key generation device 200, and also accepts, as input, information indicating a plaintext M. The ciphertext generation device 500 is a computer that generates a symmetric-key ciphertext Csk using the received main secret key sk1 and sub secret key sk2 and the plaintext M, and transmits the generated symmetric-key ciphertext Csk to the conversion device 600.

The conversion device 600 is, as a specific example, a PC. The conversion device 600 receives the sub secret key sk2 from the symmetric secret key generation device 200, receives the public key pk from the common parameter generation device 300, receives the symmetric-key ciphertext Csk from the ciphertext generation device 500, and accepts, as input, information indicating a decryption enabling condition L. The conversion device 600 is a computer that generates a transformed symmetric-key ciphertext Csk' and a transformed public-key ciphertext Cpk using the received data and the decryption enabling condition L, and transmits the generated transformed symmetric-key ciphertext Csk' and transformed public-key ciphertext Cpk to the decryption device 700.

The decryption device 700 is, as a specific example, a PC. The decryption device 700 is a computer that receives the transformed symmetric-key ciphertext Csk' and the transformed public-key ciphertext Cpk from the conversion device 600, also receives the user secret key sku from the user secret key generation device 400, decrypts a ciphertext based on the received data, and outputs a decryption result.

Figure 2:
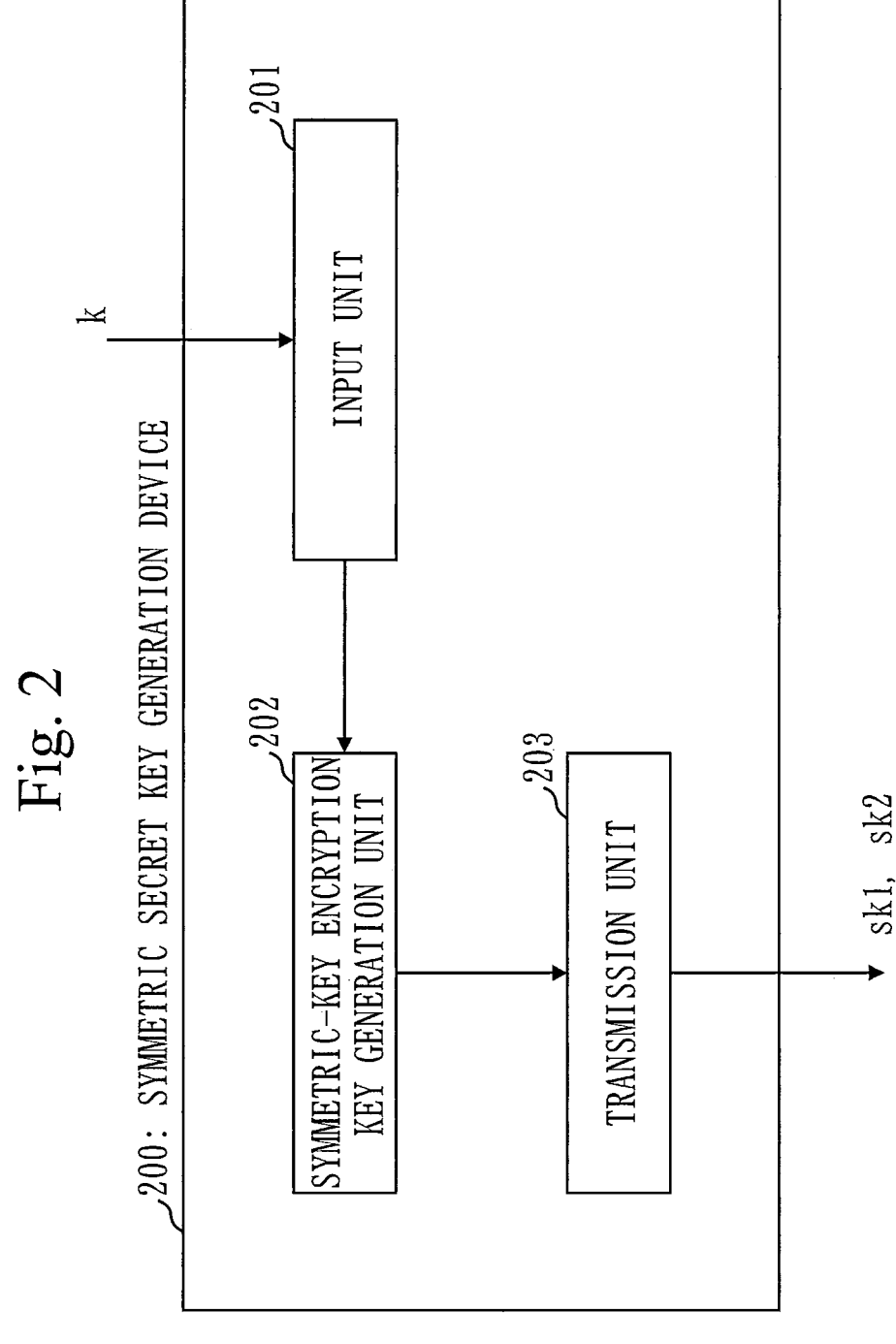
FIG. 2 is a figure illustrating an example of a configuration of a symmetric secret key generation device 200 according to Embodiment 1.

FIG. 2 is a block diagram illustrating an example of a configuration of the symmetric secret key generation device 200. As illustrated in FIG. 2, the symmetric secret key generation device 200 includes an input unit 201, a symmetric-key encryption key generation unit 202, and a transmission unit 203. Although not illustrated, the symmetric secret key generation device 200 includes a recording medium to store data used in each unit of the symmetric secret key generation device 200.

The input unit 201 accepts input of information indicating a key bit length k to be used in the ciphertext conversion system 100.

The symmetric-key encryption key generation unit 202 generates the main secret key sk1 and the sub secret key sk2. The main secret key sk1 and the sub secret key sk2 are random numbers, and are used as fundamentals of operations in the ciphertext conversion system 100. Although not illustrated, the symmetric-key encryption key generation unit 202 may include a random number generation function or the like to generate the main secret key sk1 and the sub secret key sk2.

The transmission unit 203 transmits the main secret key sk1 generated by the symmetric-key encryption key generation unit 202 to the user secret key generation device 400 and the ciphertext generation device 500. The transmission unit 203 transmits the sub secret key sk2 generated by the symmetric-key encryption key generation unit 202 to the ciphertext generation device 500 and the conversion device 600.

Figure 3:
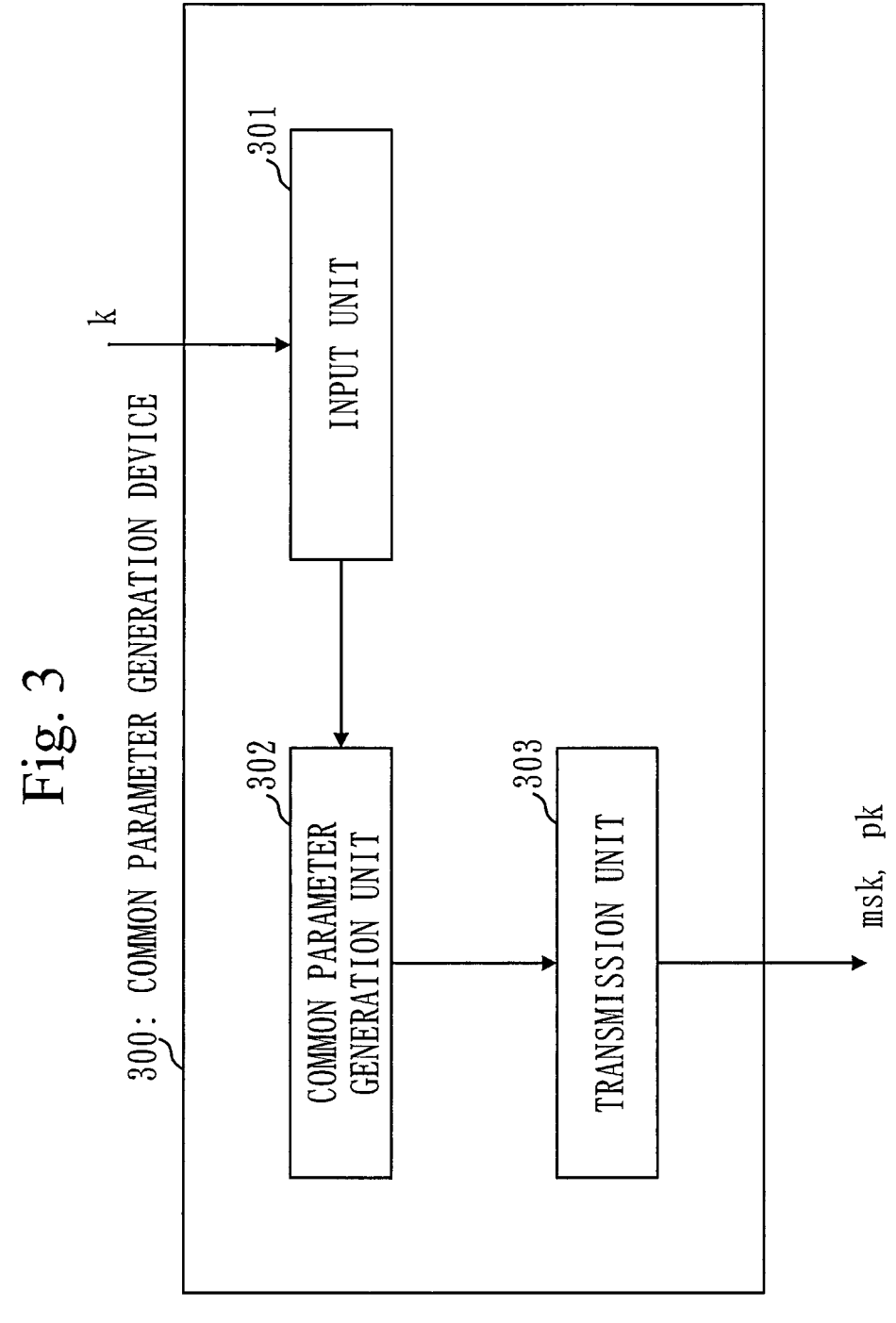
FIG. 3 is a figure illustrating an example of a configuration of a common parameter generation device 300 according to Embodiment 1.

FIG. 3 is a block diagram illustrating an example of a configuration of the common parameter generation device 300. As illustrated in FIG. 3, the common parameter generation device 300 includes an input unit 301, a common parameter generation unit 302, and a transmission unit 303. Although not illustrated, the common parameter generation device 300 includes a recording medium to store data used in each unit of the common parameter generation device 300.

The input unit 301 accepts input of information indicating the key bit length k to be used in the ciphertext conversion system 100.

The common parameter generation unit 302 generates the public key pk and the master secret key msk. The public key pk and the master secret key msk are used as fundamentals of operations in the ciphertext conversion system 100. Although not illustrated, the common parameter generation unit 302 may include a random number generation function or the like to generate the public key pk and the master secret key msk.

The transmission unit 303 transmits the public key pk generated by the common parameter generation unit 302 to the conversion device 600. The transmission unit 303 transmits the master secret key msk generated by the common parameter generation unit 302 to each of the plurality of user secret key generation devices 400.

Figure 4:
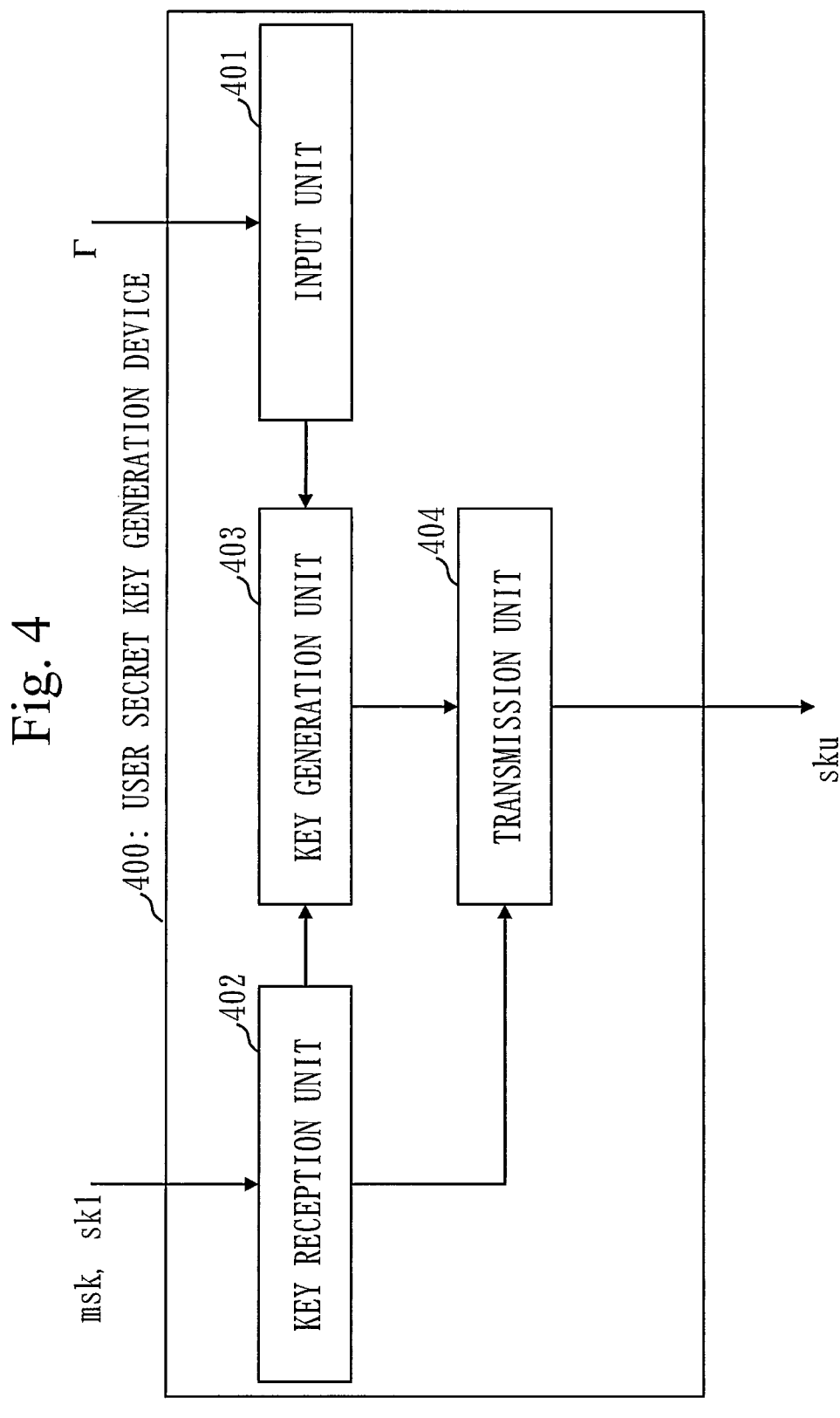
FIG. 4 is a figure illustrating an example of a configuration of a user secret key generation device 400 according to Embodiment 1.

FIG. 4 is a block diagram illustrating an example of a configuration of the user secret key generation device 400. As illustrated in FIG. 4, the user secret key generation device 400 includes an input unit 401, a key reception unit 402, a key generation unit 403, and a transmission unit 404. Although not illustrated, the user secret key generation device 400 includes a recording medium to store data used in each unit of the user secret key generation device 400.

The input unit 401 accepts input of information indicating the attribute parameter Γ.

The key reception unit 402 receives the master secret key msk and the main secret key sk1.

The key generation unit 403 generates the user secret key sku=(sk$_\Gamma$, sk1). Although not illustrated, the key generation unit 403 may include a random number generation function or the like to generate the user secret key sku.

The transmission unit 404 transmits the user secret key sku generated by the key generation unit 403 to the decryption device 700.

Figure 5:
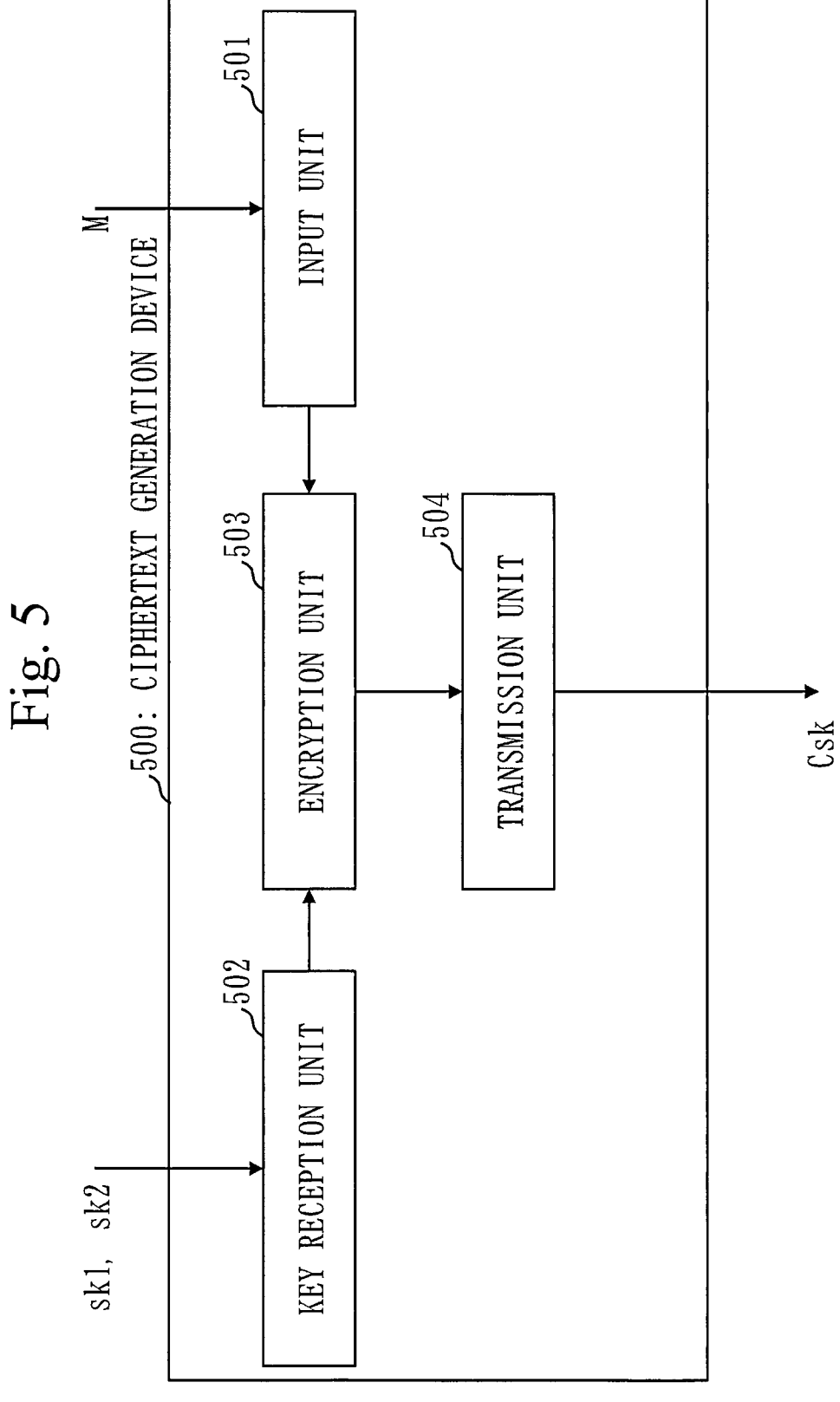
FIG. 5 is a figure illustrating an example of a configuration of a ciphertext generation device 500 according to Embodiment 1.

FIG. 5 is a block diagram illustrating an example of a configuration of the ciphertext generation device 500. As illustrated in FIG. 5, the ciphertext generation device 500 includes an input unit 501, a key reception unit 502, an encryption unit 503, and a transmission unit 504. Although not illustrated, the ciphertext generation device 500 includes a recording medium to store data used in each unit of the ciphertext generation device 500.

The input unit 501 accepts input of information indicating the plaintext M.

The key reception unit 502 receives the main secret key sk1 and the sub secret key sk2.

The encryption unit 503 generates the symmetric-key ciphertext Csk. Although not illustrated, the encryption unit 503 may include a random number generation function or the like to generate the symmetric-key ciphertext Csk.

The transmission unit 504 transmits the symmetric-key ciphertext Csk to the conversion device 600.

Figure 6:
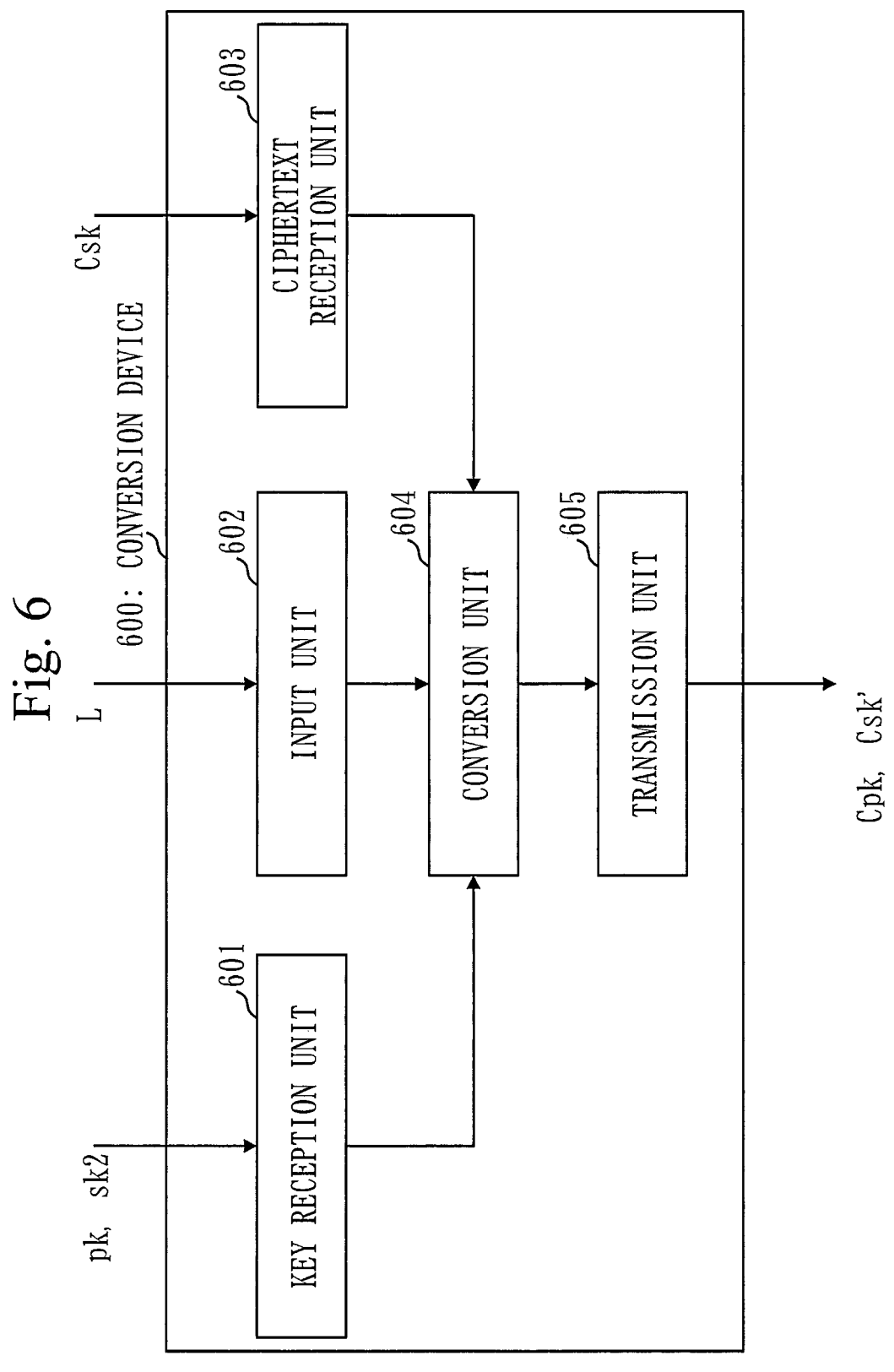
FIG. 6 is a figure illustrating an example of a configuration of a conversion device 600 according to Embodiment 1.

FIG. 6 is a block diagram illustrating an example of a configuration of the conversion device 600.

As illustrated in FIG. 6, the conversion device 600 includes a key reception unit 601, an input unit 602, a ciphertext reception unit 603, a conversion unit 604, and a transmission unit 605. Although not illustrated, the conversion device 600 includes a recording medium to store data used in each unit of the conversion device 600.

The key reception unit 601 receives the public key pk and the sub secret key sk2.

The input unit 602 accepts input of information indicating the decryption enabling condition L from an external source.

The ciphertext reception unit 603 receives the symmetric-key ciphertext Csk.

First, the conversion unit 604 generates the transformed public-key ciphertext Cpk using the decryption enabling condition L and the public key pk. At this time, the conversion unit 604 performs encryption of a public-key encryption scheme using the public key pk and the decryption enabling condition L so as to generate a transformed public-key ciphertext P and a key K corresponding to the transformed public-key ciphertext P.

Next, the conversion unit 604 transforms the symmetric-key ciphertext Csk using the sub secret key sk2 so as to generate the transformed symmetric-key ciphertext Csk'. At this time, the conversion unit 604 calculates, as at least part of the transformed symmetric-key ciphertext Csk', an exclusive-OR of a first ciphertext, a value calculated by performing encryption of a symmetric-key encryption scheme using the sub secret key sk2 and second auxiliary information, and a value calculated by performing encryption of the symmetric-key encryption scheme using the key K corresponding to the transformed public-key ciphertext P and third auxiliary information. The first ciphertext is an exclusive-OR of a value calculated by performing encryption of the symmetric-key encryption scheme using first auxiliary information and the main secret key sk1, a value calculated by performing encryption of the symmetric-key encryption scheme using the second auxiliary information and the sub secret key sk2, and the plaintext M. The transformed symmetric-key ciphertext Csk' may be composed of at least part of the transformed symmetric-key ciphertext Csk', the first auxiliary information, and the third auxiliary information. The public-key encryption scheme is, as a specific example, a functional encryption scheme or an attribute-based encryption scheme that allows an access range to be set.

The transmission unit 605 transmits the transformed public-key ciphertext Cpk and the transformed symmetric-key ciphertext Csk' to the decryption device 700.

Figure 7:
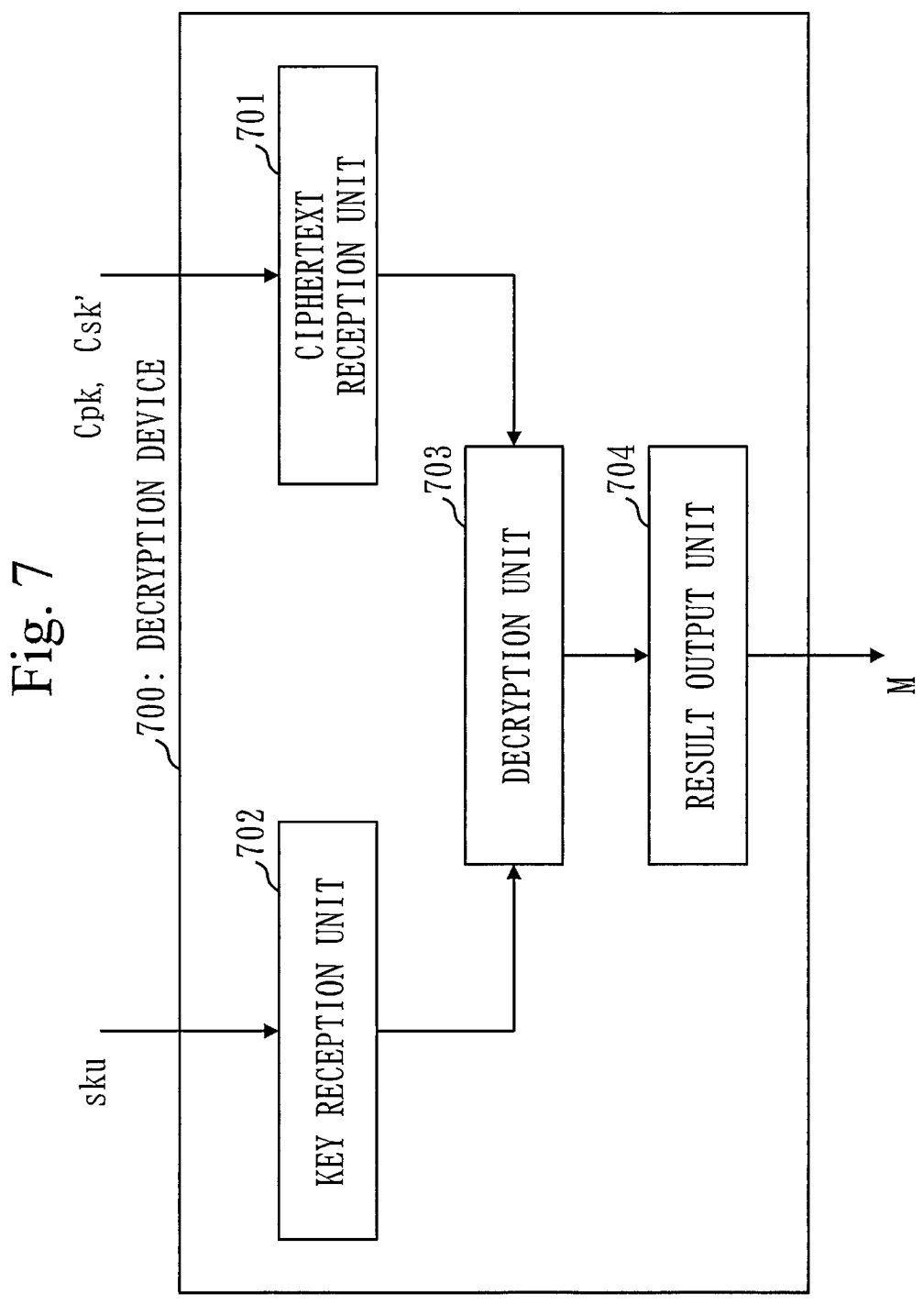
FIG. 7 is a figure illustrating an example of a configuration of a decryption device 700 according to Embodiment 1.

FIG. 7 is a block diagram illustrating an example of a configuration of the decryption device 700.

The decryption device 700 includes a ciphertext reception unit 701, a key reception unit 702, a decryption unit 703, and a result output unit 704.

The ciphertext reception unit 701 receives the transformed public-key ciphertext Cpk and the transformed symmetric-key ciphertext Csk'.

The key reception unit 702 receives the user secret key sku.

The decryption unit 703 performs a decryption process to decrypt the plaintext M.

Specifically, the decryption unit 703 first performs decryption of the attribute-based encryption scheme using the user secret key $sk_\Gamma$ corresponding to the decryption enabling condition L and the transformed public-key ciphertext Cpk, so as to decrypt the key K corresponding to the transformed public-key ciphertext Cpk.

Next, the decryption unit 703 calculates, as the plaintext M, an exclusive-OR of at least part of the transformed symmetric-key ciphertext Csk', a value calculated by performing encryption of the symmetric-key encryption scheme using the decrypted key K corresponding to the transformed public-key ciphertext Cpk, and the third auxiliary information, and a value calculated by performing encryption of the symmetric-key encryption scheme using the main secret key sk1 and the first auxiliary information.

The result output unit 704 outputs the plaintext M decrypted by the decryption unit 703.

Figure 8:
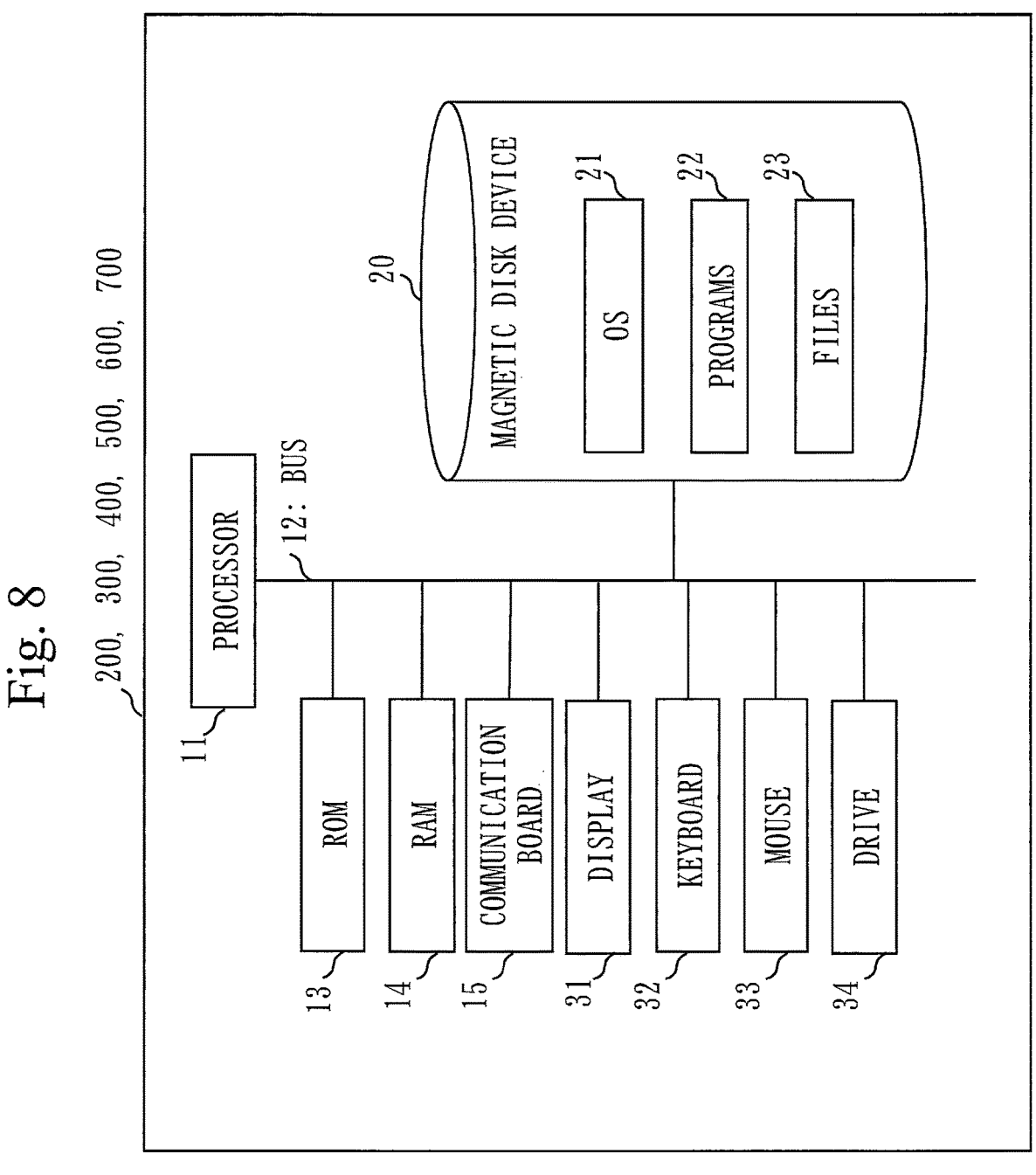
FIG. 8 is a figure illustrating an example of a hardware configuration of each of the devices according to Embodiment 1.

FIG. 8 is a figure illustrating an example of hardware resources of each of the devices according to this embodiment. As illustrated in FIG. 8, each of the devices is a general computer that includes a processor 11 (central processing unit).

The processor 11 is, as a specific example, a central processing unit (CPU), a digital signal processor (DSP), or a graphics processing unit (GPU). The processor 11 is connected with hardware devices such as a read only memory (ROM) 13, a random access memory (RAM) 14, a communication board 15, a display 31 (display device), a keyboard 32, a mouse 33, a drive 34, and a magnetic disk device 20 via a bus 12, and controls these hardware devices. The drive 34 is a device that reads from and writes to a storage medium such as a flexible disk drive (FD), a compact disc (CD), and a digital versatile disc (DVD).

The ROM 13, the RAM 14, the magnetic disk device 20, and the drive 34 are examples of a storage device.

The keyboard 32, the mouse 33, and the communication board 15 are examples of an input device.

The display 31 and the communication board 15 are example of an output device.

The communication board 15 is connected to a communication network such as a LAN, the Internet, or a telephone line with a wire or wirelessly.

The magnetic disk device 20 stores an operating system (OS) 21, programs 22, and files 23.

The programs 22 include programs that execute functions described as each "unit" in this embodiment. The programs are read out and executed by the processor 11. That is, the programs cause a computer to function as each "unit" and cause the computer to execute a procedure or a method of each "unit".

The files 23 include various pieces of data (input, output, determination results, processing results, etc.) used in each "unit" described in this embodiment.

Processes of this embodiment described based on flowcharts or the like are executed using hardware such as the processor 11, the storage device, the input device, and the output device.

What is described as each "unit" may be realized by firmware, software, hardware, or a combination of these.

Any program described in this specification may be recorded in a computer readable non-volatile recording medium. The non-volatile recording medium is, as a specific example, an optical disc or a flash memory. Any program described in this specification may be provided as a program product.

Description of Operation

A procedure for operation of each of the devices constituting the ciphertext conversion system 100 is equivalent to a ciphertext conversion method. The ciphertext conversion method is also a generic term for methods executed in each of the devices. A program that realizes the operation of each of the devices constituting the ciphertext conversion system 100 is equivalent to a ciphertext conversion program. The ciphertext conversion program is also a generic term for programs executed in each of the devices.

In the following, before describing the operation of the ciphertext conversion system 100, basic cryptographic techniques and notation used in this embodiment will be described.

Attribute-based encryption is encryption that can be decrypted only by a user who has a user secret key generated using a set of attributes Γ that satisfies a decryption condition that is set by the decryption enabling condition L. As a specific example, attribute-based encryption is composed of algorithms including the following processes.

Process 1: Process that takes, as input, setup ABESETUP, a key length, and so on, and outputs a master secret key msk and a public key pk.

Process 2: Process that takes, as input, user secret key generation ABEKEYGEN, the master secret key msk, and the set of attributes Γ, and generates a user secret key $sk_\Gamma$ corresponding to the set of attributes Γ.

Process 3: Process that takes, as input, encryption ABEENC, the public key pk, and the decryption enabling condition L, and generates a key K for symmetric-key encryption and a ciphertext P corresponding to the key K.

Process 4: Process that takes, as input, decryption ABE-DEC, the user secret key $sk_\Gamma$, and the ciphertext P, and outputs the key K encrypted as the ciphertext P if the set of attributes Γ matches the decryption enabling condition L used in generating the ciphertext P.

Common-key encryption is a technique in which a plaintext M is encrypted using a symmetric-key encryption secret key sk, and a ciphertext is decrypted using the symmetric-key encryption secret key sk. The symmetric-key encryption secret key sk is a random value, and encryption SKEENC takes, as input, the symmetric-key encryption secret key sk and the plaintext M, and outputs the ciphertext. Decryption SKEDEC takes, as input, the symmetric-key encryption secret key sk and the ciphertext, and outputs the plaintext M.

Among symmetric-key encryption, an encryption technique in a counter mode using a block cipher is used in this embodiment. In the counter mode, encryption is performed using an encryption function SENC of the symmetric-key encryption scheme and auxiliary information auxC, as indicated in [Formula 1], and decryption is performed using the encryption function SENC and the auxiliary information auxC, as indicated in [Formula 2]. Note that an operator+ represents an exclusive-OR. The auxiliary information is a counter value.

$$C = SENC(sk, auxC) + M \qquad \text{[Formula 1]}$$

$$M = SENC(sk, auxC) + C \qquad \text{[Formula 2]}$$

Figure 9:
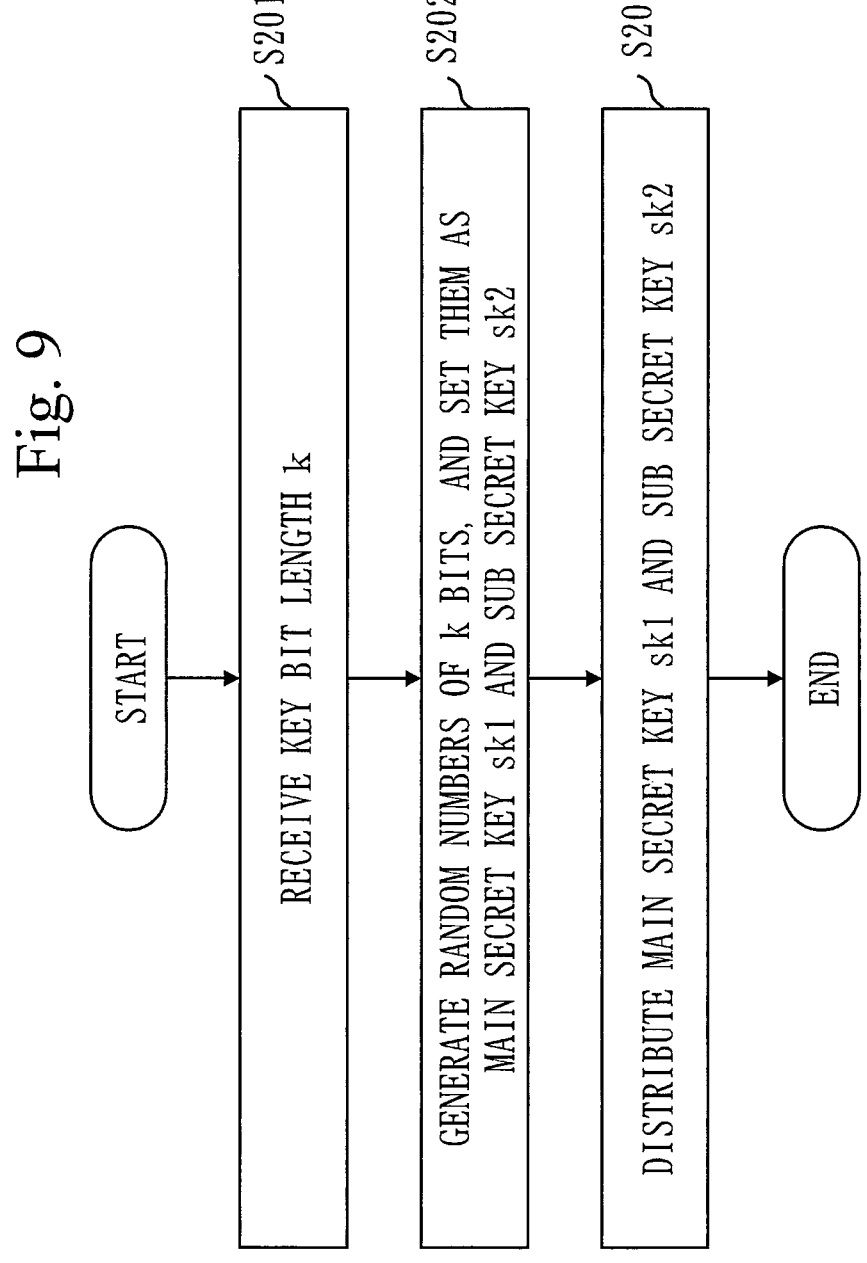
FIG. 9 is a flowchart illustrating operation of the symmetric secret key generation device 200 according to Embodiment 1.

FIG. 9 represents an example of a secret key generation process. Using FIG. 9, the secret key generation process will be described.

(Step S201: Information Input Step)

The input unit 201 accepts, as input, information indicating the key bit length k.

(Step S202: Secret Key Generation Step)

The symmetric-key encryption key generation unit 202 generates two k-bit random numbers, and set one of the generated random numbers as the main secret key sk1 and the other one of the generated random numbers as the sub secret key sk2.

(Step S203: Transmission Step)

The transmission unit 203 transmits the main secret key sk1 and the sub secret key sk2 to each device as appropriate.

Figure 10:
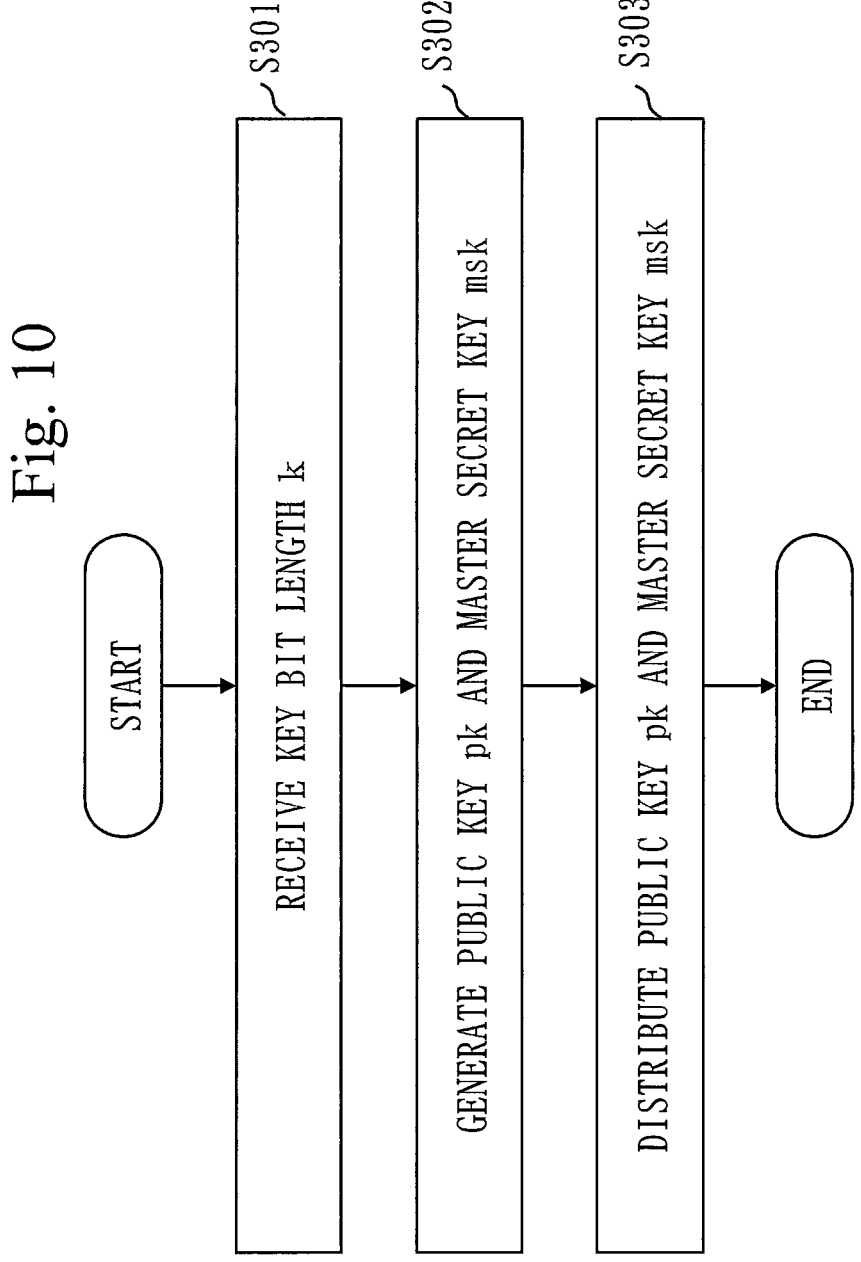
FIG. 10 is a flowchart illustrating operation of the common parameter generation device 300 according to Embodiment 1.

FIG. 10 represents an example of a parameter generation process. Using FIG. 10, the parameter generation process will be described.

(Step S301: Information Input Step)

The input unit 301 receives, as input, information indicating the key bit length k.

(Step S302: Key Generation Step)

The common parameter generation unit 302 executes setup of attribute-based encryption so as to generate the master secret key msk and the public key pk.

(Step S303: Transmission Step)

The transmission unit 303 transmits the generated master secret key msk and public key pk to each device as appropriate.

Figure 11:
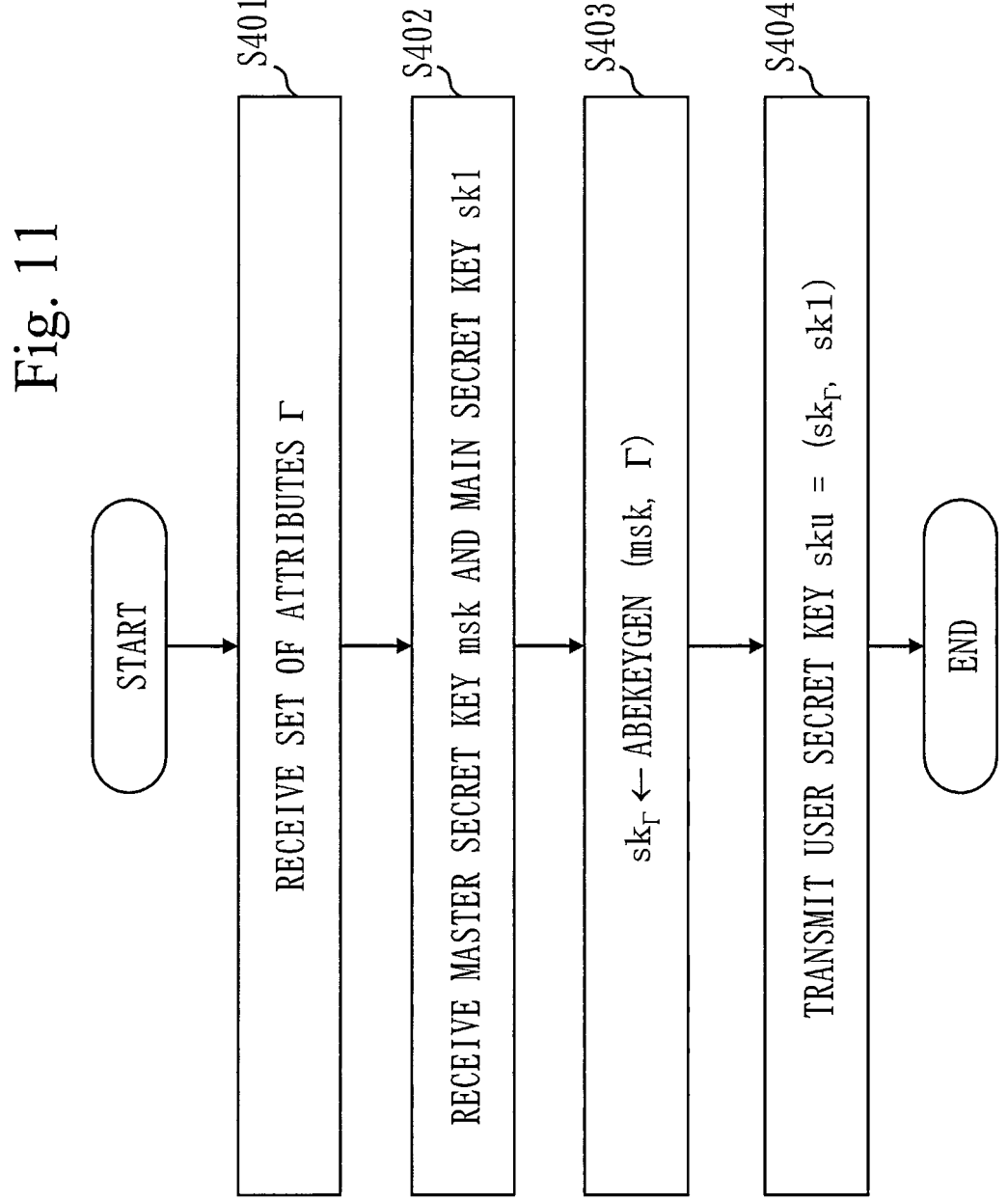
FIG. 11 is a flowchart illustrating operation of the user secret key generation device 400 according to Embodiment 1.

FIG. 11 represents an example of a user secret key generation process. Using FIG. 11, the user secret key generation process will be described.

(Step S401: Attribute Input Step)

The input unit 401 receives information indicating the attribute parameter $\Gamma$.

(Step S402: Key Input Step)

The key reception unit 402 receives the master secret key msk and the main secret key sk1.

(Step S403: User Secret Key Generation Step)

The key generation unit 403 executes user key generation ABEKEYGEN of attribute-based encryption using the attribute parameter $\Gamma$ and the master secret key msk so as to generate the user secret key $sk_\Gamma$.

(Step S404: Transmission Step)

The transmission unit 404 transmits the user secret key sku=($sk_\Gamma$, sk1) including the generated user secret key $sk_\Gamma$ to each device as appropriate.

Figure 12:
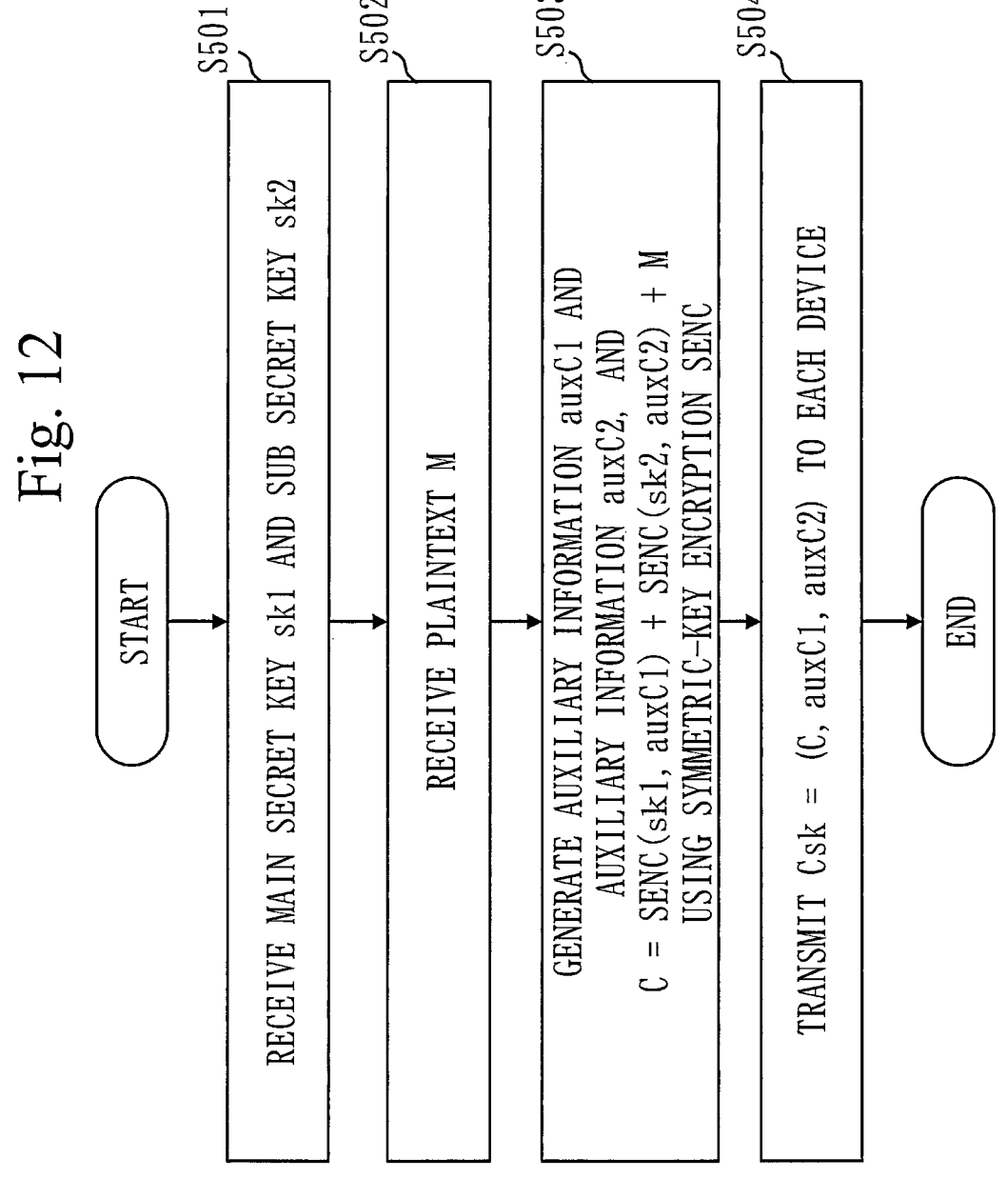
FIG. 12 is a flowchart illustrating operation of the ciphertext generation device 500 according to Embodiment 1.

FIG. 12 represents an example of a ciphertext generation process. Using FIG. 12, the ciphertext generation process will be described.

(Step S501: Key Reception Step)

The key reception unit 502 receives the main secret key sk1 and the sub secret key sk2.

(Step S502: Plaintext Input Step)

The input unit 501 accepts information indicating the plaintext M.

(Step S503: Encryption Step)

The encryption unit 503 encrypts the plaintext M, as indicated in [Formula 3]. At this time, the encryption unit 503 generates auxiliary information auxC1 and auxiliary information auxC2 each as data of an appropriate bit length. The encryption unit 503 sets the symmetric-key ciphertext Csk to be (C, auxC1, auxC2). The auxiliary information auxC1 is also called the first auxiliary information. The auxiliary information auxC2 is also called the second auxiliary information. C is the first ciphertext and is a ciphertext of the symmetric-key encryption scheme. SENC (sk1, auxC1) is a value calculated by performing encryption of the symmetric-key encryption scheme using the first auxiliary information and the main secret key sk1. SENC (sk2, auxC2) is a value calculated by performing encryption of the symmetric-key encryption scheme using the second auxiliary information and the sub secret key sk2, which is a random number.

$$C = SENC(sk1, auxC1) + SENC(sk2, auxC2) + M \qquad \text{[Formula 3]}$$

(Step S504: Transmission Step)

The transmission unit 504 transmits the symmetric-key ciphertext Csk (=(C, auxC1, auxC2)) to each device as appropriate.

FIG. 13 represents an example of a conversion process. Using FIG. 13, the conversion process will be described.

(Step S601: Key Reception Step)

The key reception unit 601 receives the public key pk and the sub secret key sk2.

(Step 602: Input Step)

The input unit 602 accepts, as input, information indicating the decryption enabling condition L.

(Step 603: Conversion Destination Generation Step)

The conversion unit 604 executes encryption ABEENC of attribute-based encryption using the public key pk and the decryption enabling condition L, as indicated [Formula 4]. Note that P is a transformed public-key ciphertext, and K is a key that corresponds to the transformed public-key ciphertext and is generated by decrypting P.

$$(K, P) = ABEENC(pk, L) \qquad \text{[Formula 4]}$$

(Step 604: Common-Key Encryption Conversion Step)

The ciphertext reception unit 603 receives the symmetric-key ciphertext Csk ((C, auxC1, auxC2)).

The conversion unit 604 generates auxiliary information auxC', performs calculation indicated in [Formula 5] using C, the sub secret key sk2, the auxiliary information auxC2, the key K, and the generated auxiliary information auxC' so as to calculate C', and sets the transformed symmetric-key ciphertext Csk' to be (C', auxC1, auxC'). Note that the right side of [Formula 5] can be transformed as indicated in [Formula 6]. The auxiliary information auxC' is the third auxiliary information. SENC (sk2, auxC2) is a value calculated by performing encryption of the symmetric-key encryption scheme using the sub secret key sk2 and the second auxiliary information. SENC (K, auxC') is a value calculated by performing encryption of the symmetric-key encryption scheme using the key K corresponding to the transformed public-key ciphertext and the third auxiliary information. C' is at least part of the transformed symmetric-key ciphertext Csk'.

$$C' = C + SENC(sk2, auxC2) + SENC(K, auxC') \qquad \text{[Formula 5]}$$

$$C + SENC(sk2, auxC2) + SENC(K, auxC') = \qquad \text{[Formula 6]}$$
$$SENC(sk1, auxC1) + SENC(K, auxC') + M$$

(Step 605: Transmission Step)

The transmission unit 605 sets the transformed public-key ciphertext Cpk to be P, and transmits the transformed public-key ciphertext Cpk and the transformed symmetric-key ciphertext Csk' to each device as appropriate.

Figure 14:
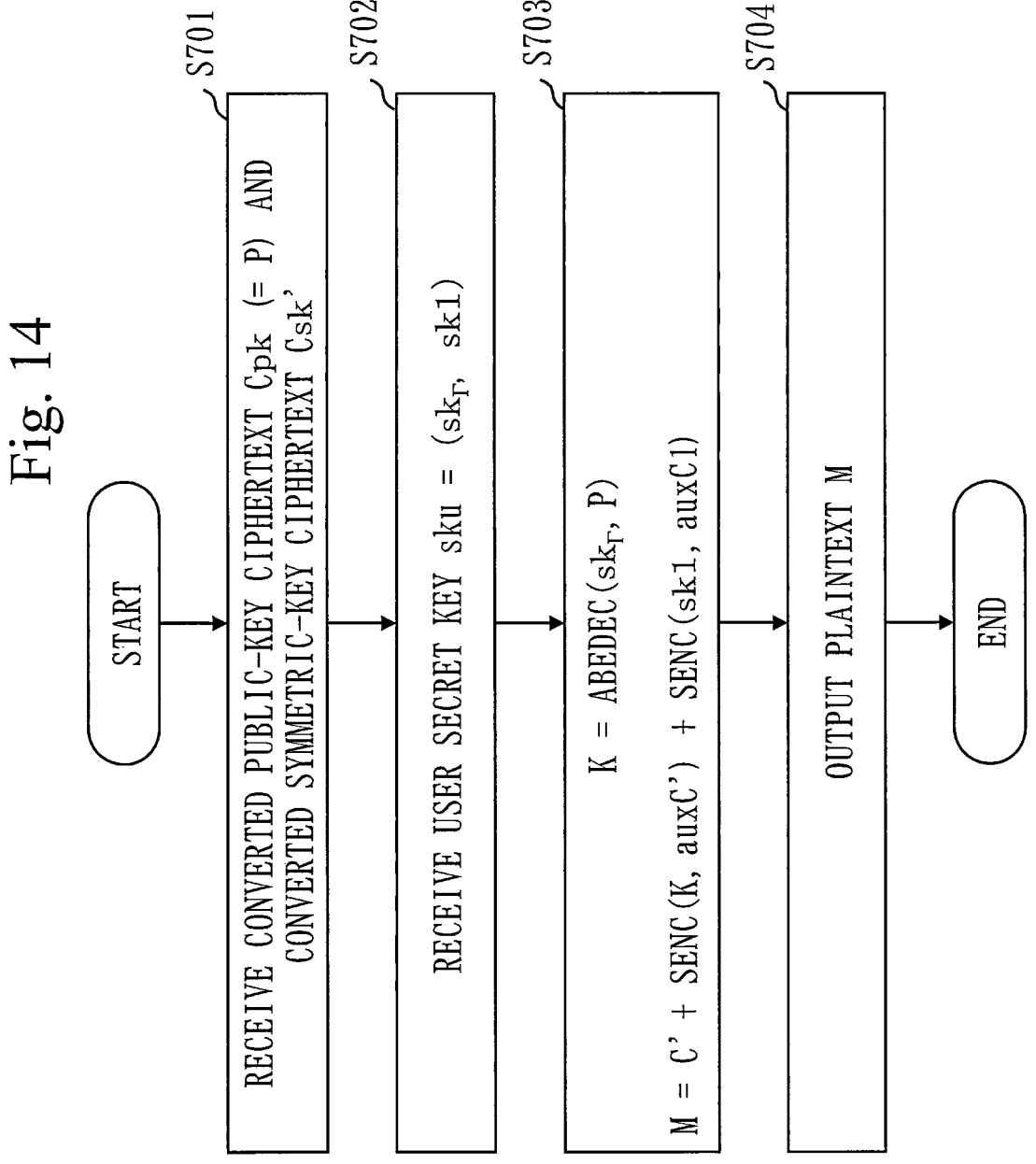
FIG. 14 is a flowchart illustrating operation of the decryption device 700 according to Embodiment 1.

FIG. 14 represents an example of a decryption process. Using FIG. 14, the decryption process will be described.

(Step S701: Ciphertext Reception Step)

The ciphertext reception unit 701 receives the transformed public-key ciphertext Cpk (=P) and the transformed symmetric-key ciphertext Csk'.

(Step S702: Key Input Step)

The key reception unit 702 receives the user secret key sku (=(sk$_\Gamma$, sk1)).

(Step 703: Decryption Process Step)

The decryption unit 703 performs calculation indicated in [Formula 7] as the decryption process of attribute-based encryption. The key K corresponds to the transformed public-key ciphertext Cpk. SENC (K, auxC') is a value calculated by performing encryption of the symmetric-key encryption scheme using the key K and the third auxiliary information. SENC (sk1, auxC1) is a value calculated by performing encryption of the symmetric-key encryption scheme using the main secret key sk1 and the first auxiliary information.

$$K = ABEDEC (sk_\Gamma, P) \qquad \text{[Formula 7]}$$
$$M = C' + SENC (K, auxC') + SENC (sk1, auxC1)$$

(Step 704: Output Step)

The result output unit 704 outputs data indicating the plaintext M obtained by the decryption process.

Description of Effects of Embodiment 1

As described above, according to this embodiment, a ciphertext of the symmetric-key encryption scheme can be transformed, without being decrypted, to a ciphertext of the public-key encryption scheme.

In addition, according to this embodiment, it is not necessary to generate a conversion key for transforming a ciphertext of the symmetric-key encryption scheme to a ciphertext of the public-key encryption scheme for each ciphertext. Therefore, according to this embodiment, the cost of generating a conversion key can be reduced, and the number of times a secret key is called to generate a conversion key can also be reduced, so that enhancement of security can be realized.

Other Configurations

<Variation 1>

Figure 15:
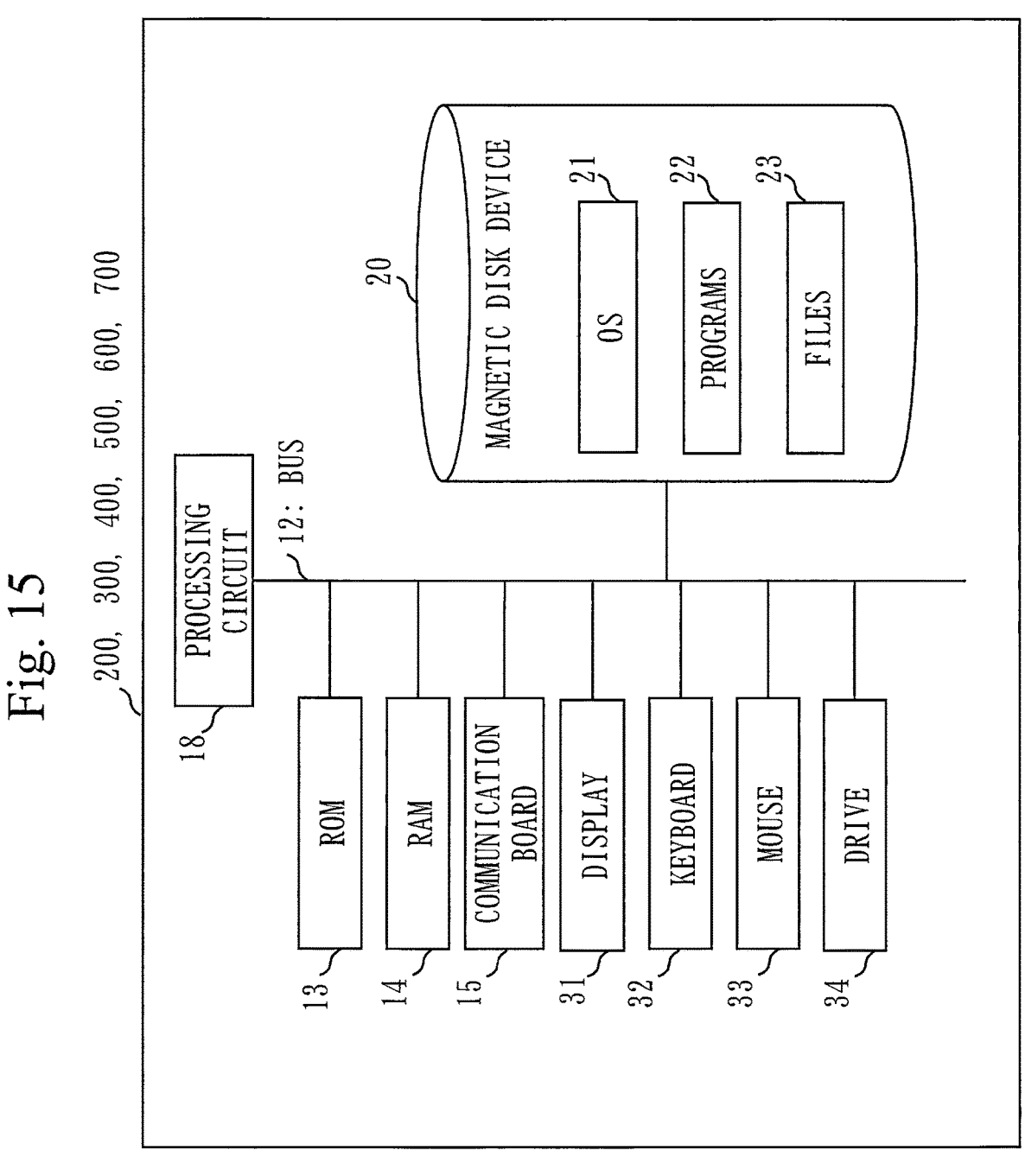
FIG. 15 is a figure illustrating an example of a hardware configuration of each of the devices according to a variation of Embodiment 1.

FIG. 15 illustrates an example of a hardware configuration of each of the devices according to this variation.

Each of the devices includes a processing circuit 18 in place of the processor 11, in place of the processor 11 and the ROM 13, in place of the processor 11 and the RAM 14, or in place of the processor 11, the ROM 13, and the RAM 14.

The processing circuit 18 is hardware that realizes at least part of the units included in each of the devices.

The processing circuit 18 may be dedicated hardware, or may be a processor that executes programs stored in the RAM 14.

When the processing circuit 18 is dedicated hardware, the processing circuit 18 is, as a specific example, a single circuit, a composite circuit, a programmed processor, a parallel-programmed processor, an application specific integrated circuit (ASIC), a field programmable gate array (FPGA), or a combination of these.

Each of the devices may include a plurality of processing circuits as an alternative to the processing circuit 18. The plurality of processing circuits share the role of the processing circuit 18.

In each of the devices, some functions may be realized by dedicated hardware, and the remaining functions may be realized by software or firmware.

As a specific example, the processing circuit 18 is realized by hardware, software, firmware, or a combination of these.

The processor 11, the ROM 13, the RAM 14, and the processing circuit 18 are collectively called "processing circuitry". That is, the functions of the functional constituent elements of each of the devices are realized by the processing circuitry.

Other Embodiments

Embodiment 1 has been described, and portions of this embodiment may be implemented in combination. Alternatively, this embodiment may be partially implemented. Alternatively, this embodiment may be modified in various ways as necessary, and may be implemented as a whole or partially in any combination.

The embodiment described above is an essentially preferable example, and is not intended to limit the present disclosure as well as the applications and scope of uses of the present disclosure. The procedures described using flowcharts or the like may be modified as appropriate.

REFERENCE SIGNS LIST

11: processor; 12: bus; 13: ROM; 14: RAM; 15: communication board; 18: processing circuit; 20: magnetic disk device; 21: OS; 22: programs; 23: files; 31: display; 32: keyboard; 33: mouse; 34: drive; 100: ciphertext conversion system; 101: Internet; 200: symmetric secret key generation device; 201: input unit; 202: symmetric-key encryption key generation unit; 203: transmission unit; 300: common parameter generation device; 301: input unit; 302: common parameter generation unit; 303: transmission unit; 400: user secret key generation device; 401: input unit; 402: key reception unit; 403: key generation unit; 404: transmission unit; 500: ciphertext generation device; 501: input unit; 502: key reception unit; 503: encryption unit; 504: transmission unit; 600: conversion device; 601: key reception unit; 602: input unit; 603: ciphertext reception unit; 604: conversion unit; 605: transmission unit; 700: decryption device; 701: ciphertext reception unit; 702: key reception unit; 703: decryption unit; 704: result output unit; auxC1, auxC2, auxC': auxiliary information; Csk: symmetric-key ciphertext; Csk': transformed symmetric-key ciphertext; Cpk: transformed public-key ciphertext; L: decryption enabling condition; M: plaintext; msk: master secret key; pk: public key; sk1: main secret key; sk2: sub secret key; sku: user secret key; $sk_r$: user secret key.

The invention claimed is:

1. A ciphertext conversion system comprising
a conversion device including
processing circuitry to perform encryption of a public-key encryption scheme using a public key and a decryption enabling condition, so as to generate a transformed public-key ciphertext and a key corresponding to the transformed public-key ciphertext, and
calculate, as at least part of a transformed symmetric-key ciphertext, an exclusive-OR of a first ciphertext, a value calculated by performing encryption of a symmetric-key encryption scheme using a sub secret key, which is a random number, and second auxiliary information, and a value calculated by performing encryption of the symmetric-key encryption scheme using the key corresponding to the transformed public-key ciphertext and third auxiliary information, the first ciphertext being an exclusive-OR of a value calculated by performing encryption of the symmetric-key encryption scheme using first auxiliary information and a main secret key, which is a random number, a value calculated by performing encryption of the symmetric-key encryption scheme using the second auxiliary information and the sub secret key, and a plaintext.

2. The ciphertext conversion system according to claim 1, wherein the transformed symmetric-key ciphertext is composed of at least part of the transformed symmetric-key ciphertext, the first auxiliary information, and the third auxiliary information.

3. The ciphertext conversion system according to claim 1, wherein the public-key encryption scheme is an attribute-based encryption scheme.

4. The ciphertext conversion system according to claim 2, wherein the public-key encryption scheme is an attribute-based encryption scheme.

5. The ciphertext conversion system according to claim 3, wherein the ciphertext conversion system further performs decryption of the attribute-based encryption scheme using a user secret key corresponding to the decryption enabling condition and the transformed public-key ciphertext, so as to decrypt the key corresponding to the transformed public-key ciphertext, and calculates, as the plaintext, an exclusive-OR of at least part of the converted symmetric-key ciphertext, a value calculated by performing encryption of the symmetric-key encryption scheme using the key corresponding to the transformed public-key ciphertext that has been decrypted and the third auxiliary information, and a value calculated by performing encryption of the symmetric-key encryption scheme using the main secret key and the first auxiliary information.

6. The ciphertext conversion system according to claim 4, wherein the ciphertext conversion system further performs decryption of the attribute-based encryption scheme using a user secret key corresponding to the decryption enabling condition and the transformed public-key ciphertext, so as to decrypt the key corresponding to the transformed public-key ciphertext, and calculates, as the plaintext, an exclusive-OR of at least part of the converted symmetric-key ciphertext, a value calculated by performing encryption of the symmetric-key encryption scheme using the key corresponding to the transformed public-key ciphertext that has been decrypted and the third auxiliary information, and a value calculated by performing encryption of the symmetric-key encryption scheme using the main secret key and the first auxiliary information.

7. A ciphertext conversion method comprising
performing encryption of a public-key encryption scheme using a public key and a decryption enabling condition, so as to generate a transformed public-key ciphertext and a key corresponding to the transformed public-key ciphertext, and
calculating, as at least part of a transformed symmetric-key ciphertext, an exclusive-OR of a first ciphertext, a value calculated by performing encryption of a symmetric-key encryption scheme using a sub secret key, which is a random number, and second auxiliary information, and a value calculated by performing encryption of the symmetric-key encryption scheme using the key corresponding to the transformed public-key ciphertext and third auxiliary information, the first ciphertext being an exclusive-OR of a value calculated by performing encryption of the symmetric-key encryption scheme using first auxiliary information and a main secret key, which is a random number, a value calculated by performing encryption of the symmetric-key encryption scheme using the second auxiliary information and the sub secret key, and a plaintext, by a computer.

8. A non-transitory computer readable medium storing a ciphertext conversion program that causes a conversion device, which is a computer, to execute
a conversion process of performing encryption of a public-key encryption scheme using a public key and a decryption enabling condition, so as to generate a transformed public-key ciphertext and a key corresponding to the transformed public-key ciphertext, and
calculating, as at least part of a transformed symmetric-key ciphertext, an exclusive-OR of a first ciphertext, a value calculated by performing encryption of a symmetric-key encryption scheme using a sub secret key, which is a random number, and second auxiliary information, and a value calculated by performing encryption of the symmetric-key encryption scheme using the key corresponding to the transformed public-key ciphertext and third auxiliary information, the first ciphertext being an exclusive-OR of a value calculated by performing encryption of the symmetric-key encryption scheme using first auxiliary information and a main secret key, which is a random number, a value calculated by performing encryption of the symmetric-key encryption scheme using the second auxiliary information and the sub secret key, and a plaintext.

* * * * *